United States Patent [19]
Smallwood et al.

[11] Patent Number: 5,485,057
[45] Date of Patent: Jan. 16, 1996

[54] GAS DISCHARGE LAMP AND POWER DISTRIBUTION SYSTEM THEREFOR

[76] Inventors: Robert C. Smallwood, Rt. 2, Box 81, Leesburg, Va. 22075; Michael P. Zarich, 1614 Judson Dr., Longmont, Colo. 80501

[21] Appl. No.: 116,150

[22] Filed: Sep. 2, 1993

[51] Int. Cl.$^6$ .................................................. H01J 7/44
[52] U.S. Cl. ............................. 315/58; 315/56; 315/57; 315/50; 315/105; 362/260; 362/217; 362/221; 362/224
[58] Field of Search ........................ 315/58, 56, 57, 315/50, 105, 247; 362/260, 217, 221, 224

[56] References Cited

U.S. PATENT DOCUMENTS

| | | | |
|---|---|---|---|
| 3,549,941 | 12/1970 | Friedmann | 315/58 |
| 3,753,071 | 8/1973 | Engel et al. | 321/2 |
| 4,109,307 | 8/1978 | Knoll | 363/101 |
| 4,259,614 | 3/1981 | Kohler | 315/219 |
| 4,293,799 | 10/1981 | Roberts | 315/256 |
| 4,316,121 | 2/1982 | Hammer et al. | 315/62 |
| 4,508,996 | 4/1985 | Clegg et al. | 315/224 |
| 4,571,526 | 2/1986 | Wesselink | 315/56 |
| 4,857,806 | 8/1989 | Nilssen | 315/72 |
| 4,939,420 | 7/1990 | Lim | 315/58 |
| 5,047,696 | 9/1991 | Nilssen | 315/312 |
| 5,189,339 | 2/1993 | Peshak | 315/58 |
| 5,208,511 | 5/1993 | Garbowicz | 315/106 |
| 5,294,865 | 3/1994 | Haraden | 315/58 |

FOREIGN PATENT DOCUMENTS 1401628  7/1975  United Kingdom.

OTHER PUBLICATIONS

International Application PCT/US91/02895, "Electronic Lamp Ballast for Gas Discharge Lamp" by Smallwood, WO 91/16802.

Primary Examiner—Robert J. Pascal
Assistant Examiner—Reginald A. Ratliff
Attorney, Agent, or Firm—Earl C. Hancock

[57] ABSTRACT

Fluorescent type lamps are arranged to have high frequency power derived from standard, commercial A.C. sources either directly or from power levels distributed from a master ballast. When the master ballast is employed, it functions as an interface between the primary power source and a distribution network to one or more modules so as to relieve the modules of operations such as initial power form conversions, filtering and power factors correcting which require large components. The module or modules driven by the master ballast output are contained within the lamp envelope or attached as an extension of the lamp envelope. The module is formed of elements mounted as a miniaturized unit configured to fit within the lamp envelope or to attach to the end of the envelope. The module includes oscillator components mounted on an envelope board so as to form an assembly with a cross-section compatible with the perimeter of the envelope itself. The module can operate independent of a master ballast unit by including power handling circuitry within the module.

11 Claims, 4 Drawing Sheets

GAS DISCHARGE LAMP AND POWER DISTRIBUTION SYSTEM THEREFOR

BACKGROUND OF THE INVENTION

1. Field of the Invention

The present invention relates to gas discharge lamp apparatus and methods as well as to power distribution systems and processes useful in association with such lamps although the power distribution feature is not necessarily limited to the discharge lamp application. More particularly, the present invention relates to fluorescent lamps, mercury vapor lamps, sodium or metal halide lamps, as well as to other electronic loads. This invention is especially useful for lighting systems and power distribution associated with such lighting systems.

2. Description of the Prior Art

Contemporary lighting systems distribute power, such as at 60 Hertz, 115 volts RMS (or 220 volts RMS), to a variety of fixtures containing gas discharge lamps. Within each fixture is a solid state ballast which functions as an electronic controller to filter and convert the A.C. power to direct current. The D.C. is next converted to a sinusoidal source, such as 20 kilohertz, to provide operating power to the lamps. Examples of prior ark ballast circuits for fluorescent lamps are shown in U.S. Pat. Nos. 3,753,071 by Engel et al; 4,109,307 by Knoll; and 4,259,614 by Kohler, as well in the Patent Cooperation Treaty Publication WO 91/16802 by Smallwood et al.

Distributed power systems for fluorescent lamps are known in the prior art, such as in U.S. Pat. Nos. 4,508,996 by Clegg et al and 5,047,696 by Nilssen. Clegg et al show D.C. driver inverters for producing high frequency signals for driving clusters of lamps. Nilssen converts primary line power to D.C., and then to 30 kHz in an inverter for parallel distribution to a plurality of light units. Power is coupled through a passive auto-transformer network to drive fluorescent light bulbs in pairs. The Clegg et al patent employs resonant circuits.

The prior art power distribution system for use in mines includes power units employing a signal at 30 kHz to drive a plurality of lamps, such as in British Patent 1,401,628. U.S. Pat. No. 4,293,799 by Roberts column 1, lines 32–42, describes the prior art to their patent as including a system wherein a plurality of "intrinsic safety" mine lamps are powered by a common power unit in a manner suggested by the aforementioned British patent. The Roberts patent shows a master unit driving a plurality of parallel connected slave units, and alleges its contribution is an improvement to such a system in the form of voltage control elements in-line between the master oscillator and the slave type units to reduce the prospect of sparking. That is, the Roberts patent includes a voltage controller between the power source and the series circuit, including the primary winding of a transformer for limiting the amount of power to a level below that which is "incentive to the atmosphere" for mine safety.

Various prior art has addressed modification of lamp envelopes to include different components. For instance, U.S. Pat. No. 4,571,526 by Wesselink shows a mercury vapor lamp configured with the discharge elements surrounding the ballast as a sealed unit. A special heat conductive thin-walled member is included for the ballast. U.S. Pat. No. 3,549,941 by Friedmann shows fluorescent lamps having starter elements, a relay and operational elements all within the lamp envelope.

U.S. Pat. No. 4,316,121 by Hammer et al also shows a lamp ballast and fluorescent bulb packaging unit. It utilizes an inductive-resistive element formed as an elongated coil parallel to the lamp tube. U.S. Pat. No. 4,857,806 by Nilssen is another form of folded lamp with ballasting circuitry in the base so it can accommodate screwing into a standard socket.

Each ballast must ensure low electromagnetic radiation, must reduce conducted noise reflected into the main power line from its internal electronics, and ideally should present as near as possible a unity power factor to the main A.C. power mains.

The contemporary fluorescent lamp ballasts typically contain rectifiers, capacitors, transistors, integrated circuits and transformers to accomplish the power conversion function. Each ballast may contain in excess of forty individual components. While a single ballast may power from one to four or more gas discharge lamps at one time, for large distributed lighting requirements in factories and department stores, for instance, thousands of these controllers are required.

SUMMARY OF THE INVENTION

Traditional systems require a solid state ballast to both condition the input A.C. power and to provide high frequency sinusoidal power to the lamps. The input A.C. power conditioning includes surge protection, filtering and more recently active input power factor correction circuitry. The output or lamp drive circuitry contains a high frequency oscillator and transformer. The traditional ballast is a large unit (i.e., about twenty-five cubic inches) which requires a certified electrician to install.

One of the features of the present invention is a high frequency oscillator circuit miniaturized for containment within the envelope of a lamp, or as a small module attached to the end of the lamp. The power oscillator volume is a cylinder of less than five cubic inches. Sufficient circuitry is provided such that the lamp will function either as a stand-alone unit connected to primary A.C. power, or as a slave unit connected to a power factor correction unit as a master in large, multiple fixture installations.

The present invention is concerned with the apparatus and method of construction of a module for driving a gas discharge lamp having heater elements contained within an envelope and for doing this in response to electrical power from a source. Power is received from that source with an oscillator coupled to the received power for transforming that received power to an output signal at a frequency and voltage suitable for causing the lamp to produce visible light through gas discharge within the lamp envelope. An elongated circuit board mounts the oscillator within a volume having a cross-section configured substantially the same as the cross-section of the lamp envelope. The board is attached for forming an end of the lamp envelope with the oscillator output signal connected to the lamp heater elements.

With the circuit board positioned within the lamp envelope, the power is receivable via prong-type conductor pins extending from an endcap. It is possible to attach the circuit board externally to an end of the lamp envelope with the module including a sleeve for retaining the board therewithin. The power source can produce standard A.C. power with the module further including a circuit mounted on the circuit board for converting the received A.C. power for actuating the oscillator. If the power source produces D.C. power, the module includes means for actuating the oscillator from the received power from the D.C. source.

Typically, fluorescent lamp envelopes contain first and second heater elements at respective ends of the envelope. A module, in accordance with this invention, includes a direct connection of heater power from the oscillator output to the first of the heater elements. The module further includes conductors extending the length of the envelope to the second of the heater elements for connecting the oscillator output thereto. These conductors are preferably positioned along the inner surface of the envelope to minimize damage in handling.

The power factor correction unit employed in the present invention is designed to accept conventional 50/60 Hz A.C. power to filter and power factor correct this energy, and to provide smooth D.C. voltage, such as 110 volts. The power factor correction unit may supply from one to tens of fluorescent ballast lamps in parallel. In small lamp installations, such as for workshop or home use, the ballast lamp will function directly from the main A.C. power lines without the necessity of an intervening power factor correction unit.

Additionally, in large, multiple fixture installations, a qualified electrician is not required to install numerous individual ballasts. The wiring is simplified to attaching A.C. power only to the fixture as the ballast is wholly contained with the lamp.

The simplicity of the slave ballast units permits configuring those slaves so they will fit as an attachment module on the end of a fluorescent lamp. Alternatively, manufacture of the lamps can include the slave ballast as an integral part thereof.

A conventional gas discharge lamp is designed to include a miniature electronic power oscillator which will both heat the cathode and supply the necessary high voltage and current to illuminate the fluorescent type of gas discharge tube. The electronics is constructed into a module which fits completely inside the envelope of the gas discharge lamp, or is attachable as a module to the end of the lamp envelope. At one end of the tube, electrodes are provided to connect a D.C. source of energy, such as 110 volts or conventional 110 volts AC, 60 Hz, which supplies power to the internal electronic oscillator. The electronics and associated electrodes are constructed in one integrated assembly which aides in the manufacture, test, and assembly of the lamp.

Additionally, the unit is so constructed as to optimize the heat removal from the circuitry. The power oscillator internal to the tube produces sine wave power at several hundred kilohertz which aides in reducing the size of the internal magnetic components as well as in minimizing the electromagnetic field emissions from the lamp. The miniature power oscillator is placed in a ferrous metal cylinder to facilitate heat transfer and reduce electromagnetic radiation.

The direct current (110 volts D.C., for example) potential required to operate the ballast lamp is designed with a magnitude which is easily derived from conventional existing 50 Hz or 60 Hz power sources. The size and power level of the D.C. source is selected so as to enable powering from one ballast lamp to tens of them in parallel. The ballast lamp thus makes possible fluorescent lighting systems with centralized power conditioning equipment. Such new systems eliminate bulky and redundant ballasts which are presently required to operate fluorescent lighting systems. The two-pronged connector at one end of the lamp facilitates installing or changing lamps which are mountable, either vertically or horizontally, while retaining the relative stability of contemporary fixtures for receiving elongated fluorescent lamps.

Another feature of the present invention relates to placement within the gas discharge lamp envelope a complete, highly efficient power oscillator circuit, thereby eliminating bulky components which are presently mounted external to the lamp. A single electronic assembly is provided through the use of integrated circuits and surface mount technology which will enable manufacture of the gas discharge lamp in accordance with this invention in a simple, reliable process. The invention permits design of a unit for D.C. input levels which are readily obtainable from existing conventional A.C. power sources, thereby adding to the universality of the lamp.

A second feature of the present invention relates to apparatus and processes for separating the power conditioning elements associated with a fluorescent lighting system in a common master ballast unit which parallel feeds a plurality of slave ballast units either attached to, or embedded in, the envelope of an elongated fluorescent type lamp. While the invention is primarily intended for fluorescent systems, it is believed it may have wider power distribution significance.

Accordingly, the present invention is directed to a gas discharge lamp power distribution system for fluorescent lamps, or the like, and is composed of a master unit and one or more gas discharge lamps adapted to cooperate with that master unit. The master unit has an input and an output with the input receiving A.C. power from a source. Power factor correction is performed in the master unit, and reflected to the source at the master unit input. The A.C. power is converted to D.C. power at the master unit output.

It is thus possible to parallel couple a plurality of gas discharge lamps to the master unit output. Each of those lamps is configured with an elongated envelope having a light producing medium contained therein. A module is associated with the envelope to interface with the master unit output. The module includes a circuit board having an oscillator circuit mounted thereon, with that board positioned at one end of the elongated envelope. Further, the board assembly is constructed to have a cross-section conforming as an extension of the elongated envelope. The output of the oscillator circuit is applied for exciting the medium, as by energizing heater elements and placing a potential across the medium to cause it to produce light.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
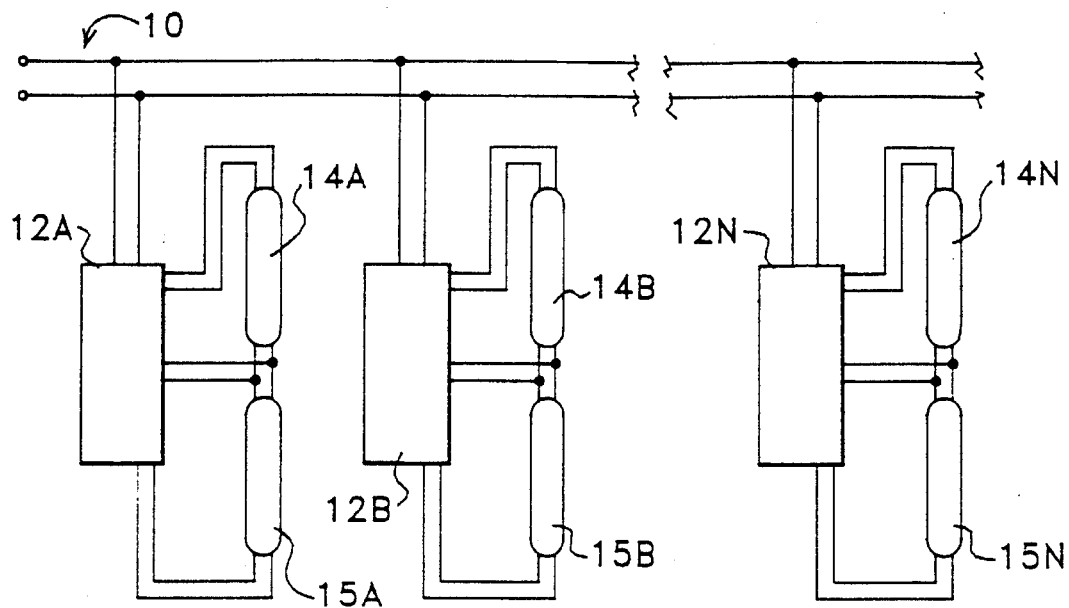
FIG. 1 is a schematic diagram of a typical prior art power distribution system for fluorescent lamps.

A conventional fluorescent lamp power distribution system is shown in schematic diagram form in FIG. 1 wherein standard input A.C. power 10 is introduced at the input terminals. In the United States, this input is usually 60 Hz at 110 or 220 volts A.C. This power is introduced in parallel to a plurality of assemblies associated with each of an array of lamp fixtures. These assemblies include a converter, or ballast unit 12A–12N which converts the primary A.C. input to a high frequency, such as 20–30 kilohertz, to drive a set of typically two series connected fluorescent lamps. Thus, ballast unit 12A drives lamps 14A and 15A in series.

Figure 2A:
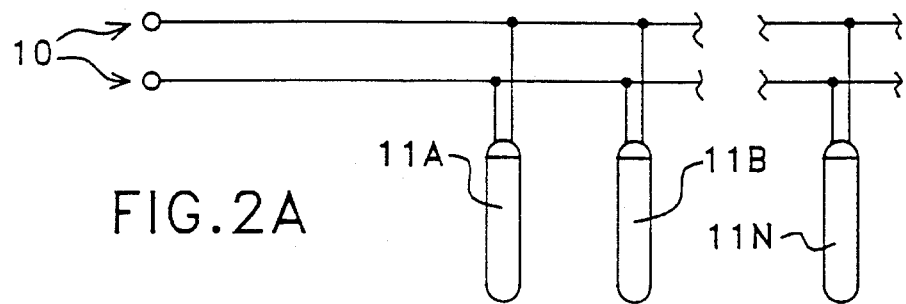
FIG. 2A is a fluorescent lamp power distribution system in accordance with the present invention with ballast lamps coupled in parallel directly to an A.C. main.
Figure 2B:
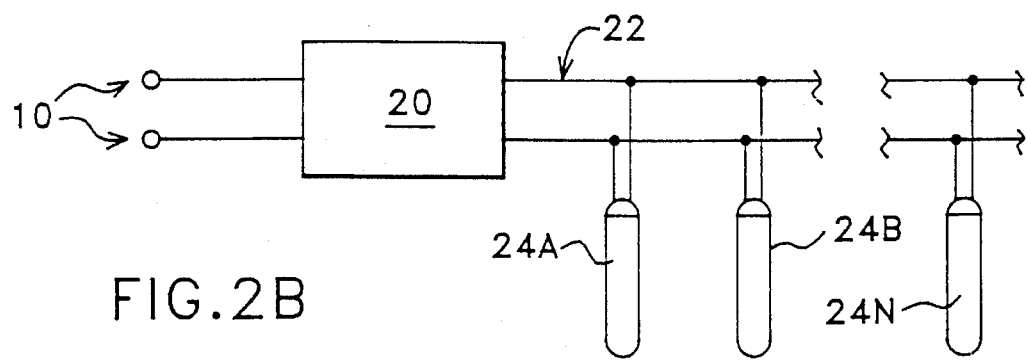
FIG. 2B is a fluorescent lamp power distribution system in accordance with the present invention powered by a converter and power factor correction master unit.

Lamp power distribution systems in accordance with this invention are shown in FIGS. 2A and 2B wherein the primary commercially-available power 10 is coupled to either system. A stand-alone configuration is shown in FIG. 2A wherein the main power 10 is connected in parallel into a plurality of lamps 11A–11N each of which is self-sufficient in that it contains its own power handling elements preferably including a conducted line noise filter and a power oscillator along the lines of those described later herein.

FIG. 2B is likewise driven by a conventional power system at input 10, but includes at least one master power converting unit 20 the output 22 of which is coupled in parallel into a plurality of slave ballast lamps 24A–24N. This reduces the amount of circuitry that each lamp 24 must incorporate thereby decreasing the volume of the module that is implanted in, or attached to, the lamp envelope while increasing its efficiency and heat handling capabilities. Conventional power factor correction circuits require acceptance of rather large components (frequently bulky capacitors) for bulk energy storage and filtering thereby increasing the volume of the module at the lamp should that module include such circuitry. Thus, inclusion of the power factor correction in the master unit 20 relieves the lamps of that volumetric burden associated with that function. Master ballast units 20 contain input filters, preferably along with suitable power factor correction circuits, to convert the 60 Hz power internally to a high voltage D.C. while presenting better than 0.99 power factor loading to the A.C. source.

Figure 3:
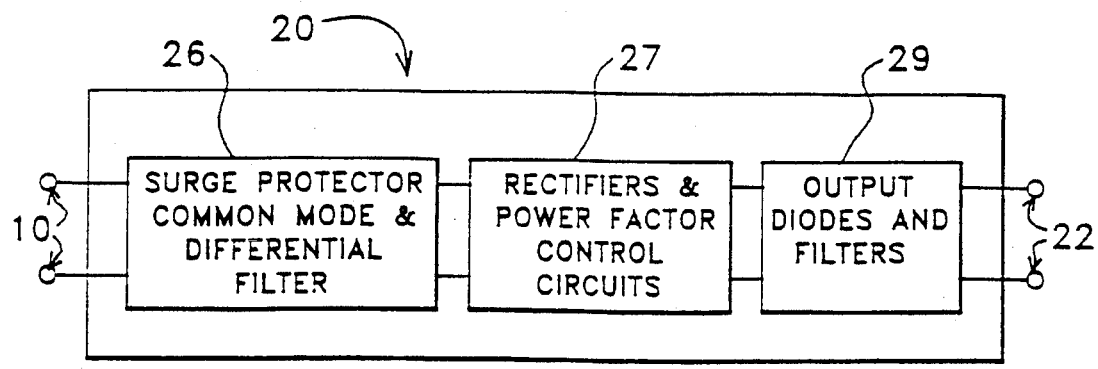
FIG. 3 is a general block diagram of the master conditioning unit of the FIG. 2B embodiment.

The major sections of the master ballast 20 are shown in sequential block form in FIG. 3. The 110/220 VAC input 10 is initially passed through surge protection unit 26 where it is also filtered. The active power factor of the filtered output from block 26 is corrected initially in block section 27 via conventional control circuitry. The A.C. is next rectified in block 27 which can include other electronic functions, if desired, such as fault detection. Output power switching is accomplished by a network of output diodes and filters 29 which finally produces the D.C. desired for output bus 22. Thus the power conditioning functionality and complexity of a traditional ballast is concentrated in one, much higher powered unit 20. Typically, master ballast 20 is capable of driving a bank of thirty or more ballast lamps where those lamps include their own oscillator circuit and gas discharge operating components, such as described later herein, for instance.

In operation, master ballast 20 (shown in general block form in FIG. 3) receives the input power from a conventional power main 10. The primary input power 10 is initially passed through circuitry 26 for surge protection and common mode and differential filtering. The A.C. is then rectified and appropriate power factor correction reflected back into the primary mains 10 via circuit 27 which likewise drives the control electronics. Output diodes and filters apply the resulting output from circuit block 29 into secondary lamp feed bus 22.

Figure 4:
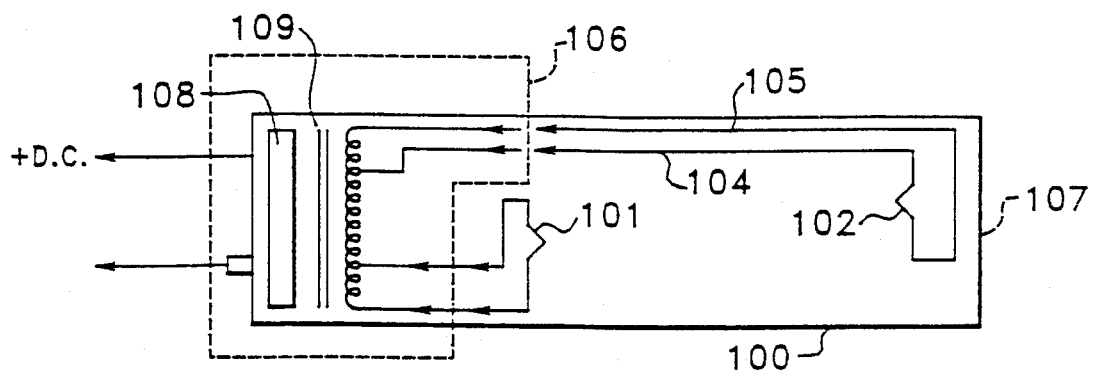
FIG. 4 is a somewhat idealized schematic diagram of a gas discharge lamp including the power oscillator as in integral element thereof.

A block diagram of an embodiment of a ballast lamp 100 is shown in FIG. 4. The key to utilizing existing fluorescent lamp design with its 20,000 plus hours of life expectancy is to provide adequate heating power to the cathodes 101 and 102. For ballast lamp 100, this is accomplished by routing two thin wires 104 and 105 down the lamp wall to the end heater 102. The potential difference between these wires is developed by the power oscillator 108 in assembly 106 and its associated output transformer 109. After lamp ignition, as in conventional ballasts, this potential is approximately 2.5 volts RMS. The power oscillator 108 similarly heats the local heater or cathode 101. The high voltage starting and running potential are established as in a conventional ballast across the secondary of the power oscillator output transformer 109. The potential difference between local heater 101 and end heater 102 is thus 110 VRMs during normal lamp operation. This potential is, however, in the form of a high frequency sine wave with a nearly perfect crest factor (1.414).

Figure 5:
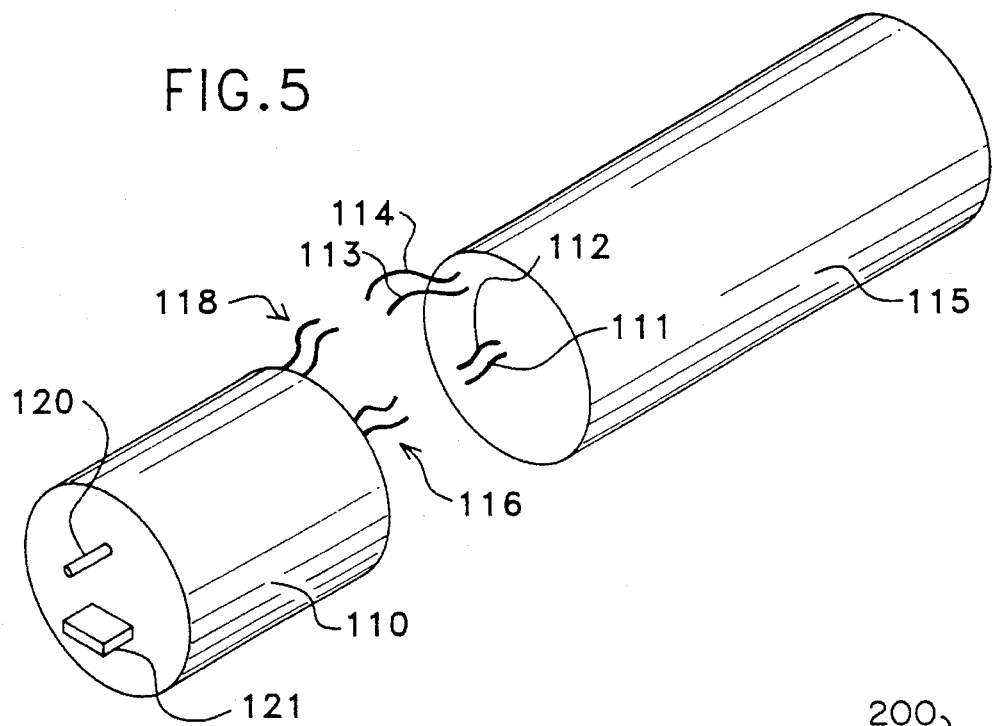
FIG. 5 is an alternate embodiment of an attachment of the ballast module to a lamp envelope.

As shown in FIG. 5, the power oscillator assembly can take the form of a cylindrical unit 110, containing the hybrid electronics and miniaturized magnetics. Four leads 111, 112, 113 and 114, which are internal to the envelope of tube 115, are connected to respective output pairs 116 and 118 of module 110, and the entire power oscillator assembly is preferably bonded to tube 115 somewhat like the manner a two-pronged endcap is attached to contemporary fluorescent lamps.

The lamp shown in FIG. 5 is intended for a system wherein the A.C. main power is converted to D.C. power at a remote unit (such as master ballast 20 of FIG. 2B) which is then connected to the lamp. Thus, the two different shaped electrodes 120 and 121 are respectively cylindrical and rectangular, and serve to key the lamp during installation so that the correct polarity of the high voltage D.C. is applied. A rectangular cross-section is acceptable for cylindrical terminal 120, although preferably at 90° to ground terminal 121 to provide an alternate polarity protection scheme. The internal electronic oscillator also contains reverse polarity protection to prevent tube damage for improperly-wired ballast lamp sockets.

Note that keying of the connection electrodes is not necessary if the module 110 employs a full wave rectifier, such as a diode bridge which can handle any polarity, and protects against polarity reversal. It is acceptable to employ pins similar to a contemporary fluorescent lamp for ease of installation, but preferably with a different pin orientation such as wider or narrower spacings between the pins. This would prevent inadvertent installation of the lamp in a conventional fixture.

The outside shell of the oscillator assembly 110 is constructed of a thin sheet of ferrous metal. The internal electronics are mounted to a metal substrate which is attached to the outer shell. Thus, a heat conduction path is established to help minimize the internal electronic temperatures. The metal also serves as an electromagnetic shield to minimize radiation. The shell may further be attached to the metal structure of lamp fixtures to further increase the heat sink capability of the ballast lamp.

Figure 6:
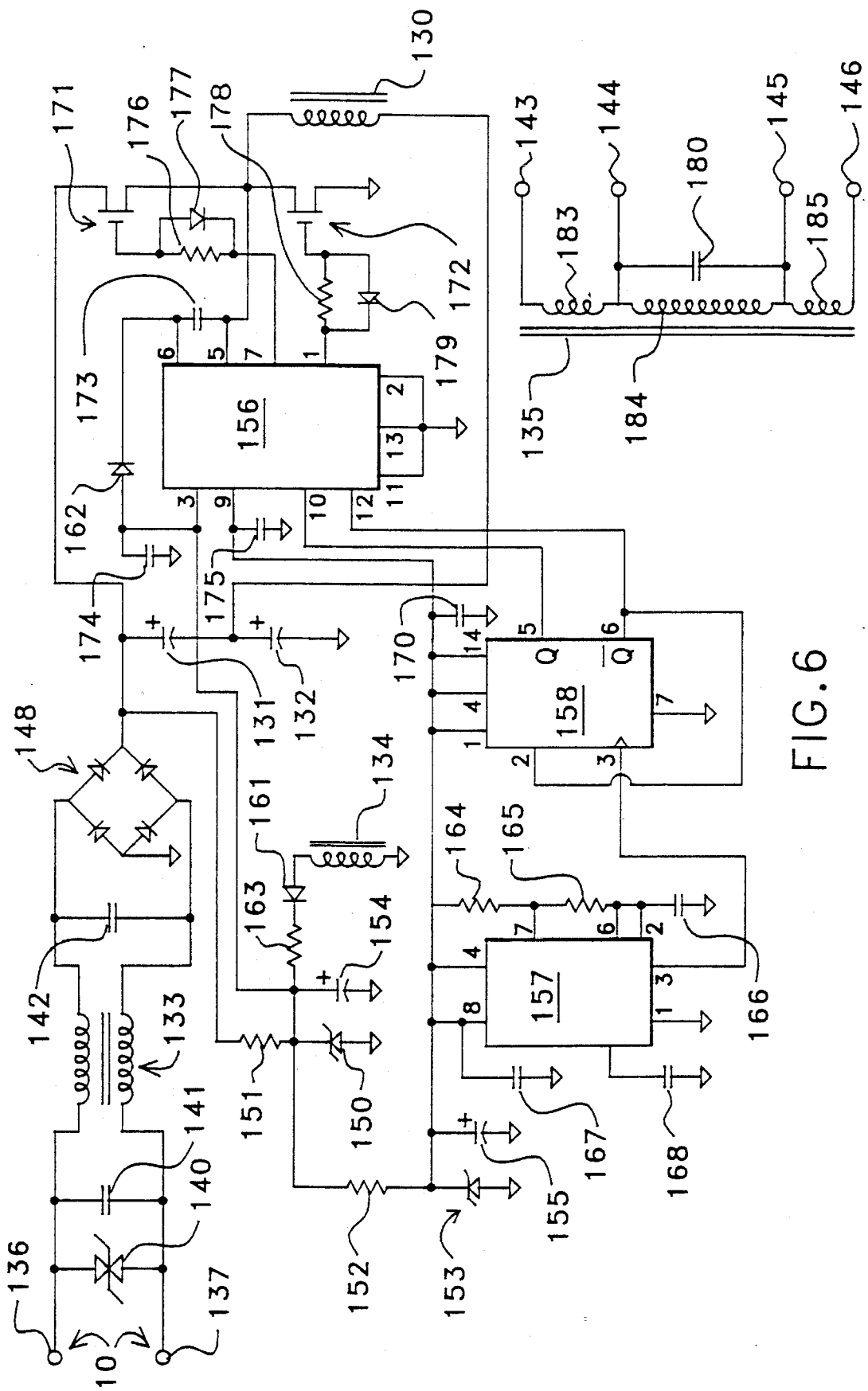
FIG. 6 is a circuit diagram of a power oscillator suitable for use with the ballast lamp structure of the present invention.

FIG. 6 is a schematic diagram of the power oscillator which is a miniaturized electronic ballast configured to fit inside the fluorescent tube. Most (ninety-five percent or more) of the components are surface mount devices. The exceptions are components, such as the transformer, including primary 130 and secondaries shown at 134 and 135, bulk storage capacitors 131 and 132, inductive coupler 133, and several diodes. Circuit board pins 136 and 137 are connected to the two prongs at one endcap of the fluorescent tube. A.C. power 10, typically 90 to 130 volts RMS, 50 or 60 Hz, is applied to the tube.

The far end heater of the tube is connected via wires passing the length of the tube. While external placement of the end heater wires is acceptable, they are preferably inside the tube and coupled to circuit board pins 143 and 144 of the output transformer secondary 135. The near end heater of the tube is connected to pins 145 and 146. The tube socket containing pins 136 and 137 and the power oscillator circuit are one integrated part that is mated with the tube wires at the time of tube assembly either permanently or detachably.

In operation, the FIG. 6 power oscillator functions as follows. Transient voltage suppressor (TVS) 140 prevents spikes and surges from damaging the electronics. Capacitor 141 and inductive coupler 133, along with capacitor 142, form a common mode EMI filter. Diode bridge 148 is an integrated circuit diode bridge for rectifying the input A.C. power. Resistor 151 and Zener diode 150 are a bootstrap circuit (typically 15 volt) to supply initial power to integrated circuit chip 156. Resistors 152 and Zener diode 153 likewise provide +5 volt bootstrap power for integrated circuits 156, 157 and 158. Capacitors 154 and 155 are bulk storage capacitors for these DC supplies.

Secondary winding 134, diodes 161 and 162, and resistor 163 feed auxiliary power to the +5 and +15 volt supplies after the power oscillator has started. Integrated circuit 157 is a CMOS 555 timer chip which provides several hundred kilohertz clock signals to integrated circuit chip 158. The network of resistors 164 and 165 and capacitor 166 set the oscillator frequency while capacitors 167 and 168 are noise decoupling capacitors. Clock signals from chip 157 are fed to chip 158 which is an HCT74 flip-flop coupled to divide the oscillator clock signals by two to provide a symmetrical square wave signal to integrated circuit 156. While the circuit disclosed was constructed to produce an output signal at transformer 130 with a frequency of 220 kilohertz, it is believed advantageous to design the circuit to function in the megahertz range.

Integrated circuit 156 is preferably an IR2110S gate driver circuit. Power MOS FETS 171 and 172 are connected in a half-bridge configuration to drive the primary 130 of the output transformer. Capacitor 173 is the bootstrap capacitor for chip 156, while diode 162 is the charging diode for capacitor 173. Capacitors 174 and 175 are decoupling capacitors for chip 156. Networks of resistor 176 and diode 177, as well as resistor 178 and diode 179, prevent cross-conduction of 171 and 172, thereby minimizing power loss and EMI generation. It is possible to realize cross-conduction prevention by including some AND gates between the output of the divider circuit 158 and the driver chip 156.

Such gates would logically AND the short pulses from the oscillator circuit 157 with the divider 158 output to prevent cross-conduction at the output FET transistors 171 and 172 which drive the primary of output transformer 130.

Capacitor 180 is the resonant tank capacitor for the output transformer so that while square wave drives appear across primary 130, a quasi-sinusoidal drive is actually applied to the fluorescent tube. After tube ignition, windings 184 of secondary 135 applies approximately 100 volts RMS across the tube, while windings 183 and 185 apply power (such as at 2.7 volts RMS) across the far-and-near end heaters, respectively.

Figure 7:
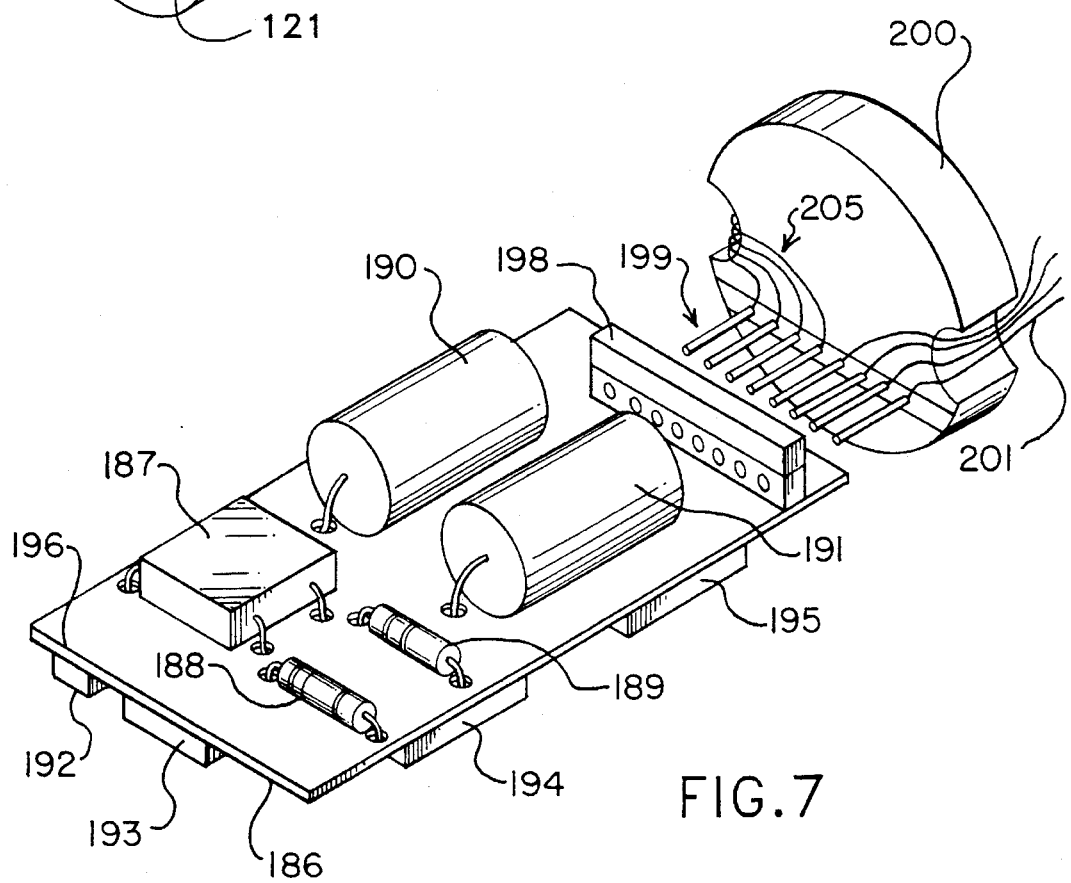
FIG. 7 is an isometric view of an electronics assembly constructed for placement within a lamp envelope or for incorporation in a module attachable to the end of the lamp envelope.

An exemplary combination of electronic elements adapted for use in conjunction with the envelope of a gas discharge lamp is presented in FIG. 7. The planar circuit board 186 is shown with through-hole mounted components 187–191 on the upper surface, and surface mounted components 192–195 on the lower surface of board 186. Element 187 might represent a diode bridge assembly, while 188 and 189 are resistors and 190 and 191 are bulk capacitors or inductor type components. The surface mounted elements 192–195 might include integrated circuit chips, surface mounted resistors and capacitors or the like.

Board 186 has a receptacle 198 mounted on one end as shown for receiving the pins of array 199 extending from output transformer 200. A group of four leads 201 extend from transformer 200 to provide the connections to the heater elements, such as 143–146 of FIG. 6, and the heater connections of FIG. 4 for instance. Another group of four leads 205 couple the primary of the transformer and the secondary winding which functions with the oscillator circuit, such as the FIG. 6 transformer primary 130 and secondary winding 134.

Although not shown in FIG. 7, outer end 196 of board 186 preferably would mount within an end cap having dual power connecting prongs for receiving the A.C. or D.C. input power. Note that the opposite end (such as end 107 of lamp 100 in FIG. 4) can have any of a variety of known mounting structures as desired. It could include dummy pins similar to contemporary fluorescent lamp bulbs if contemporary fluorescent receptacles elements are employed. Otherwise, a blank endcap and receptacle would suffice for retaining the bulb within a fixture.

Figure 8:
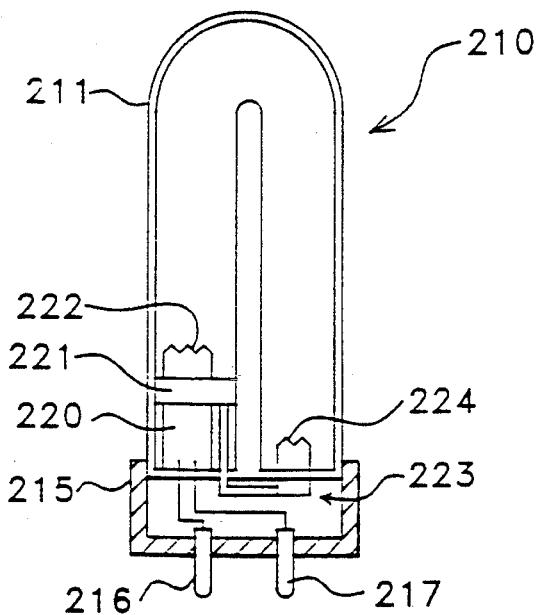
FIG. 8 is a partially-sectioned view of a gas discharge lamp with the envelope thereof formed in a U-shaped configuration with the control elements contained within that envelope.

FIG. 8 illustrates yet another embodiment of a gas discharge lamp 210 having the elongated envelope 211 constructed preferably with a tubular, or semi-circular, cross-section but in a "U" shape. Base 215 is secured to envelope 211 as shown with pins 216 and 217 adapted to plug into an A.C. receptacle to provide the primary power source. The thus received A.C. power is connected to a module composed of a board 220 and output transformer 221. Board 220 has the oscillator circuit and other components and circuitry including the power factor correction circuit mounted thereon for driving the output transformer 221.

The module, including board 220 and transformer 221, can be encapsulated in a heat transferring material so as to completely fill the end of the envelope 211 in which it is placed. Otherwise, the interior of envelope 211 is filled with a gas discharge medium for producing visible light upon excitation. Heater element 222 is connected directly to a pair of output connections of transformer 221, while leads 223 pass from transformer 222 through the wall of envelope 211 into the base 215 and thence through the wall of envelope 211 on its opposite end so as to connect with heater element 224. Note that it is possible to suppress undesired radio frequency radiation from the device by shielding, or by ferrite beads on the output leads as is conventional.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. A module for driving a gas discharge lamp having heater elements contained within an envelope in response to electrical power from a source and wherein the envelope has at least one endcap comprising:

means for receiving power from the source and including prong type conductor pins extending from the envelope endcap, an oscillator coupled to said receiving means for transforming said received power to an output signal at a frequency and voltage for causing the lamp to produce visible light through gas discharge within the lamp envelope, an elongated circuit board mounting said oscillator within a volume having a cross-section configured substantially the same as the cross-section of the lamp envelope with said circuit board positioned within the lamp envelope, and means attaching said board for forming an end of the lamp envelope with said oscillator output signal connected to the lamp heater elements.

2. A module in accordance with claim 1 wherein at least a portion of said circuit board is attached externally to an end of the lamp envelope, said module including a sleeve retaining said board therewithin.

3. A module in accordance with claim 1 wherein the power source produces standard A.C. power, said module further including means mounted on said circuit board for converting said received power for actuating said oscillator.

4. A module in accordance with claim 1 wherein the power source produces D.C. power, said module further including means for actuating said oscillator from said received power from the D.C. source.

5. A module for driving a gas discharge lamp having heater elements contained within an envelope in response to electrical power from a source wherein the envelope contains first and second heater elements at respective ends of the envelope comprising:

means for receiving power from the source, an oscillator coupled to said receiving means for transforming said received power to an output signal at a frequency and voltage for causing the lamp to produce visible light through gas discharge within the lamp envelope, means connecting heater power directly from said oscillator output to said first heater element, conductors extending the length of said envelope to said second heater element for connecting said oscillator output thereto, an elongated circuit board mounting said oscillator within a volume having a cross-section configured substantially the same as the cross-section of the lamp envelope, and means attaching said board for forming an end of the lamp envelope with said oscillator output signal connected to the lamp heater elements.

6. A module in accordance with claim 5 wherein said conductors are positioned along the inner surface of said envelope.

7. A gas discharge lamp power distribution system for fluorescent lamps and the like comprising:

a master unit having an input and an output and further including means at said input for receiving A.C. power from a source, means for correcting the power factor reflected to said source at said input by said receiving means, and means for converting the A.C. power to a D.C. power at said output, and a plurality of gas discharge lamps coupled in parallel to said master unit output, each said lamp of said plurality including an elongated envelope having a light producing medium contained therein, and a module including a circuit board having an oscillator circuit mounted thereon with said board positioned at one end of said elongated envelope and having a cross-section conforming as an extension of said envelope, and means coupling the output of said oscillator circuit for exciting said medium to cause it to produce light.

8. The system of claim 7 wherein said module is contained within said envelope, and said envelope has electrical contacts therethrough for introducing electrical power from said master unit output to said oscillator circuit.

9. The system in accordance with claim 7 wherein said envelope has gas discharge elements electrically connected to leads passing through one end of said envelope and said module includes a first set of connections on one side for receiving said master unit output and a second set of connections on the other side for attachment to said envelope leads whereby said module and said envelope form a single extended unit when attached to one another.

10. A fluorescent lamp which employs power from a master unit having an input and an output and with the master unit further including means at its input for receiving A.C. power from a source, means for correcting the power factor reflected to the source at its input by the receiving means, and means for converting the A.C. power to a D.C. power at its output, said lamp comprising:

means electrically coupled in to the master unit output, an elongated envelope having a light producing medium contained therein, and a module including a circuit board having an oscillator circuit mounted thereon with said board positioned at one end of said elongated envelope and having a cross-section conforming as an extension of said envelope, and means coupling the output of said oscillator circuit for exciting said medium to cause it to produce light.

11. A master unit for electrically powering a plurality of gas discharge lamps each of which has an elongated envelope having a light producing medium contained therein, and a module conforming as an extension of the envelope and including an oscillator circuit positioned at one end of the elongated envelope with the output of the oscillator circuit coupled for exciting the medium to cause it to produce light, said master unit comprising:

an input and an output, means at said input for receiving A.C. power from a source, means for correcting the power factor reflected to said source at said input by said receiving means, and means for converting the A.C. power to a D.C. power at said output, whereby electrically coupling of said output to the oscillator circuit will cause it to excite the light producing medium while permitting minimal size of the module.

* * * * *